United States Patent
Lee et al.

(10) Patent No.: US 9,605,731 B2
(45) Date of Patent: Mar. 28, 2017

(54) POWER TRANSMISSION APPARATUS FOR VEHICLE

(71) Applicant: Hyundai Motor Company, Seoul (KR)

(72) Inventors: Suengho Lee, Whasung-Si (KR);
Jongsool Park, Whasung-Si (KR);
Seongwook Hwang, Whasung-Si (KR);
Byunghyun Lee, Whasung-Si (KR);
Kyeonghun Lee, Whasung-Si (KR);
Minjun Song, Whasung-Si (KR);
Jongmin Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 121 days.

(21) Appl. No.: 14/559,813

(22) Filed: Dec. 3, 2014

(65) Prior Publication Data
US 2016/0084351 A1 Mar. 24, 2016

(30) Foreign Application Priority Data

Sep. 24, 2014 (KR) .......................... 10-2014-0127459

(51) Int. Cl.
| | |
|---|---|
| F16H 3/08 | (2006.01) |
| F16H 3/091 | (2006.01) |
| F16H 3/00 | (2006.01) |
| F16H 3/085 | (2006.01) |
| F16H 3/093 | (2006.01) |

(52) U.S. Cl.
CPC .............. *F16H 3/091* (2013.01); *F16H 3/006* (2013.01); *F16H 3/085* (2013.01); *F16H 3/093* (2013.01); *F16H 2003/008* (2013.01); *F16H 2003/0822* (2013.01); *F16H 2003/0931* (2013.01); *F16H 2003/0933* (2013.01); *F16H 2200/0056* (2013.01); *F16H 2200/0086* (2013.01)

(58) Field of Classification Search
CPC .. F16H 3/006; F16H 2003/0931; F16H 3/091; F16H 47/02
USPC ........................... 74/330, 331, 333, 340, 664
See application file for complete search history.

(56) References Cited

U.S. PATENT DOCUMENTS

| | | | | |
|---|---|---|---|---|
| 3,589,483 A | * | 6/1971 | Smith ..................... | F16H 3/097 192/3.52 |
| 6,874,381 B2 | * | 4/2005 | Berger .................... | F16H 61/28 74/329 |

(Continued)

FOREIGN PATENT DOCUMENTS

| | | |
|---|---|---|
| JP | 2005-54957 A | 3/2005 |
| JP | 2007-225040 A | 9/2007 |
| JP | 2007-332991 A | 12/2007 |

*Primary Examiner* — Ha D Ho
(74) *Attorney, Agent, or Firm* — Morgan, Lewis & Bockius LLP

(57) ABSTRACT

A power transmission apparatus may include a first input shaft having at least one input gear and selectively connected to a power source through a first clutch, a second input shaft having at least one input gear and selectively connected to the power source through a second clutch, a first speed output unit including a first output shaft and at least one speed gear engaged with the at least one input gear on the first and second input shafts, a second speed output unit including a second output shaft and at least one speed gear engaged with the at least one input gear on the first and second input shafts and rotatably disposed on the second output shaft, and an idle module including at least two idle gears on an idle shaft.

3 Claims, 10 Drawing Sheets

(56) References Cited

U.S. PATENT DOCUMENTS

| | | | |
|---|---|---|---|
| 7,340,973 B2* | 3/2008 | Hiraiwa | F16D 21/04 |
| | | | 74/330 |
| 7,383,749 B2 | 6/2008 | Schäfer et al. | |
| 9,145,952 B2* | 9/2015 | Lee | F16H 3/12 |
| 2007/0199393 A1* | 8/2007 | Hattori | F16H 3/006 |
| | | | 74/331 |
| 2007/0266810 A1* | 11/2007 | Forsyth | F16H 3/006 |
| | | | 74/331 |

* cited by examiner

FIG. 2

| gear stage | CL1 | CL2 | SL1 | | | SL2 | | | SL3 | | SL4 | | | SL5 | |
|---|---|---|---|---|---|---|---|---|---|---|---|---|---|---|---|
| | | | 2nd | N | 6th | 3rd | N | 7th | 4th | N | 5th | N | REV | IDU | N |
| R |  | △ |  | ○ |  |  | ○ |  |  | ○ |  |  | ● |  | ○ |
| N |  |  |  | ○ |  |  | ○ |  |  | ○ |  | ○ |  |  | ○ |
| 1ST |  | △ | ● |  |  |  | ○ |  |  | ○ |  | ○ |  | ● |  |
| 2ND | △ |  | ● |  |  |  | ○ |  |  | ○ |  | ○ |  |  | ○ |
| 3RD |  | △ |  | ○ |  | ● |  |  |  | ○ |  | ○ |  |  | ○ |
| 4TH | △ |  |  | ○ |  |  | ○ |  | ● |  |  | ○ |  |  | ○ |
| 5TH |  | △ |  | ○ |  |  | ○ |  |  | ○ | ● |  |  |  | ○ |
| 6TH | △ |  |  |  | ● |  | ○ |  |  | ○ |  | ○ |  |  | ○ |
| 7TH |  | △ |  | ○ |  |  |  | ● |  | ○ |  |  |  |  | ○ |

FIG. 6

| gear stage | CL1 | CL2 | SL1 | | | SL2 | | | SL3 | | SL4 | | | SL5 | |
|---|---|---|---|---|---|---|---|---|---|---|---|---|---|---|---|
| | | | 3rd | N | 5th | 2nd | N | 4th | 7th | N | 6th | N | REV | IDU | N |
| R1 | △ | | | ○ | | | ○ | | | ○ | | | ● | ● | |
| R2 | | △ | | ○ | | | ○ | | | ○ | | | ● | | ○ |
| N | | | | ○ | | | ○ | | | ○ | ○ | | | | ○ |
| 1ST | △ | | | ○ | | ● | | | | ○ | ○ | | | ● | |
| 2ND | | △ | | ○ | | ● | | | | ○ | ○ | | | | ○ |
| 3RD | △ | | ● | | | | ○ | | | ○ | ○ | | | | ○ |
| 4TH | | △ | | ○ | | | | ● | | ○ | ○ | | | | ○ |
| 5TH | △ | | | | ● | | ○ | | | ○ | ○ | | | | ○ |
| 6TH | | △ | | ○ | | | ○ | | | ○ | ● | | | | ○ |
| 7TH | △ | | | ○ | | | ○ | | ● | | | ○ | | | ○ |

POWER TRANSMISSION APPARATUS FOR VEHICLE

CROSS-REFERENCE TO RELATED APPLICATION

The present application claims priority to and the benefit of Korean Patent Application No. 10-2014-0127459 filed on Sep. 24, 2014, the entire contents of which is incorporated herein for all purposes by this reference.

BACKGROUND OF THE INVENTION

Field of the Invention

The present invention relates to a power transmission apparatus for a vehicle using a double clutches. More particularly, the present invention relates to a power transmission apparatus for a vehicle that can reduce the number of components, weight and length and improve mountability by realizing a first forward speed using an idle module for a reverse speed.

Description of Related Art

Environmentally-friendly technique of vehicles is very important technique on which survival of future motor industry is dependent. Vehicle makers are focusing on development of environmentally-friendly vehicles to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

The DCT includes two clutch devices and a gear train applied to a manual transmission. The DCT selectively transmits torque input from an engine to two input shafts by using two clutches, changes a speed by using the gear train, and outputs the changed torque.

Such the DCT is used to realize a compact transmission having more than five forward speeds. Since two clutches and synchronizing devices are controlled by a controller according to the DCT, manual shift maneuver is unnecessary for controlling the DCT. Therefore, the DCT is one type of automated manual transmissions (AMT).

The DCT, compared with an automatic transmission using planetary gear sets, has excellent power delivery efficiency and change and addition of components is very easy in the DCT. Therefore, the DCT can meet fuel consumption regulations and multi-speeds efficiency may be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission apparatus for a vehicle having advantages of improving mountability by disposing an idle module for a reverse speed on an additional shaft and minimizing a length of the transmission apparatus, and reducing the number of components and weight by achieving a first forward speed using the idle module.

A power transmission apparatus for a vehicle according to exemplary embodiments of the present invention may include a first input shaft having at least one input gear fixedly disposed on an exterior circumference thereof and is selectively connected to a power source through a first clutch, a second input shaft having at least one input gear fixedly disposed on an exterior circumference thereof and is selectively connected to the power source through a second clutch, a first speed output unit including a first output shaft disposed in parallel with the first and second input shafts and at least one speed gear engaged with the at least one input gear on the first and second input shafts and rotatably disposed on the first output shaft, and changing and outputting torque transmitted from the first input shaft or the second input shaft by connecting the at least one speed gear to the first output shaft, a second speed output unit including a second output shaft disposed in parallel with the first and second input shafts and at least one speed gear engaged with the at least one input gear on the first and second input shafts and rotatably disposed on the second output shaft, and changing and outputting torque transmitted from the first input shaft or second input shaft by connecting the at least one speed gear to the second output shaft, and an idle module including at least two idle gears on an idle shaft disposed in parallel with the first and second input shafts, wherein one of the idle gears is engaged with any one input gear on the first input shaft, another of the idle gears is engaged with any one input gear on the second input shaft, and any one of the idle gears engaged with the input gears is selectively connected to the idle shaft.

In various exemplary embodiments, first, second, and third input gears may be fixedly disposed on the first input shaft, and fourth and fifth input gears may be fixedly disposed on the second input shaft.

The first speed output unit may include the first output shaft disposed in parallel with and apart from the first and second input shafts, a second speed gear rotatably disposed on the first output shaft and engaged with the second input gear, a sixth speed gear rotatably disposed on the first output shaft and engaged with the third input gear, a first synchronizer selectively connecting the second speed gear or the sixth speed gear to the first output shaft, a third speed gear rotatably disposed on the first output shaft and engaged with the fourth input gear, a seventh speed gear rotatably disposed on the first output shaft and engaged with the fifth input gear, a second synchronizer selectively connecting the third speed gear or the seventh speed gear to the first output shaft, and a first output gear fixedly disposed on the first output shaft.

The second speed output unit may include the second output shaft disposed in parallel with and apart from the first and second input shafts, a fourth speed gear rotatably disposed on the second output shaft and engaged with the first input gear, a third synchronizer selectively connecting the fourth speed gear to the second output shaft, a fifth speed gear rotatably disposed on the second output shaft and engaged with the fifth input gear, a reverse speed gear rotatably disposed on the second output shaft, a fourth synchronizer selectively connecting the fifth speed gear or the reverse speed gear to the second output shaft, and a second output gear fixedly disposed on the second output shaft.

The idle module may include the idle shaft disposed in parallel with and apart from the first and second input shafts, a first idle gear fixedly disposed on a first end portion of the idle shaft and engaged with any one input gear on the first input shaft, a second idle gear including an idle input gear and an idle output gear integrally formed with each other and rotatably disposed on a second end portion of the idle shaft, wherein the idle input gear is engaged with any one input gear on the second input shaft and the idle output gear is engaged with the reverse speed gear disposed on any one of the first and second output shafts, and a fifth synchronizer selectively connecting the second idle gear to the idle shaft.

The first idle gear may be engaged with the first input gear on the first input shaft, the idle input gear of the second idle gear may be engaged with the fourth input gear on the second input shaft, and the idle output gear of the second idle gear may be engaged with the reverse speed gear on the second output shaft.

The fifth synchronizer may selectively connect the idle output gear of the second idle gear to the idle shaft.

In various exemplary embodiments, the first speed output unit may include the first output shaft disposed in parallel with and apart from the first and second input shafts, a third speed gear rotatably disposed on the first output shaft and engaged with the second input gear, a fifth speed gear rotatably disposed on the first output shaft and engaged with the third input gear, a first synchronizer selectively connecting the third speed gear or the fifth speed gear to the first output shaft, a second speed gear rotatably disposed on the first output shaft and engaged with the fourth input gear, a fourth speed gear rotatably disposed on the first output shaft and engaged with the fifth input gear, a second synchronizer selectively connecting the second speed gear or the fourth speed gear to the first output shaft, and a first output gear fixedly disposed on the first output shaft.

The second speed output unit may include the second output shaft disposed in parallel with and apart from the first and second input shafts, a seventh speed gear rotatably disposed on the second output shaft and engaged with the first input gear, a third synchronizer selectively connecting the seventh speed gear to the second output shaft, a sixth speed gear rotatably disposed on the second output shaft and engaged with the fifth input gear, a reverse speed gear rotatably disposed on the second output shaft, a fourth synchronizer selectively connecting the sixth speed gear or the reverse speed gear to the second output shaft, and a second output gear fixedly disposed on the second output shaft.

The idle module may include the idle shaft disposed in parallel with and apart from the first and second input shafts, a first idle gear fixedly disposed on a first end portion of the idle shaft and engaged with any one input gear on the first input shaft, a second idle gear including an idle input gear and an idle output gear integrally formed with each other and rotatably disposed on a second end portion of the idle shaft, wherein the idle input gear is engaged with any one input gear on the second input shaft and the idle output gear is engaged with the reverse speed gear disposed on any one of the first and second output shafts, a third idle gear rotatably disposed on the idle shaft and engaged with any one input gear on the second input shaft, and a fifth synchronizer selectively connecting the third idle gear to the idle shaft.

The first idle gear may be engaged with the second input gear on the first input shaft, the idle input gear of the second idle gear may be engaged with the sixth input gear on the second input shaft, the idle output gear of the second idle gear may be engaged with the reverse speed gear on the second output shaft, and the third idle gear may be engaged with the fifth input gear on the second input shaft.

In various exemplary embodiments, first, second, and third input gears may be fixedly disposed on the first input shaft, and fourth, fifth, and sixth input gears may be fixedly disposed on the second input shaft.

The first speed output unit may include the first output shaft disposed in parallel with and apart from the first and second input shafts, a third speed gear rotatably disposed on the first output shaft and engaged with the second input gear, a fifth speed gear rotatably disposed on the first output shaft and engaged with the third input gear, a first synchronizer selectively connecting the third speed gear or the fifth speed gear to the first output shaft, a second speed gear rotatably disposed on the first output shaft and engaged with the fourth input gear, a fourth speed gear rotatably disposed on the first output shaft and engaged with the fifth input gear, a second synchronizer selectively connecting the second speed gear or the fourth speed gear to the first output shaft, and a first output gear fixedly disposed on the first output shaft.

The second speed output unit may include the second output shaft disposed in parallel with and apart from the first and second input shafts, a seventh speed gear rotatably disposed on the second output shaft and engaged with the first input gear, a third synchronizer selectively connecting the seventh speed gear to the second output shaft, a sixth speed gear rotatably disposed on the second output shaft and engaged with the fifth input gear, a reverse speed gear rotatably disposed on the second output shaft, a fourth synchronizer selectively connecting the sixth speed gear or the reverse speed gear to the second output shaft, and a second output gear fixedly disposed on the second output shaft.

The idle module may include the idle shaft disposed in parallel with and apart from the first and second input shafts, a first idle gear fixedly disposed on a first end portion of the idle shaft and engaged with any one input gear on the first input shaft, a second idle gear including an idle input gear and an idle output gear integrally formed with each other and rotatably disposed on a second end portion of the idle shaft, wherein the idle input gear is engaged with any one input gear on the second input shaft and the idle output gear is engaged with the reverse speed gear disposed on any one of the first and second output shafts, a third idle gear rotatably disposed on the idle shaft and engaged with any one input gear on the second input shaft, and a fifth synchronizer selectively connecting the third idle gear to the idle shaft.

The first idle gear may be engaged with the second input gear on the first input shaft, the idle input gear of the second idle gear may be engaged with the sixth input gear on the second input shaft, the idle output gear of the second idle gear may be engaged with the reverse speed gear on the second output shaft, and the third idle gear may be engaged with the fifth input gear on the second input shaft.

According to the exemplary embodiments of the present invention, seven forward speeds may be achieved without changing in a length by disposing a synchronizer involved in a first forward speed on an idle shaft involved in a reverse speed.

The methods and apparatuses of the present invention have other features and advantages which will be apparent from or are set forth in more detail in the accompanying drawings, which are incorporated herein, and the following Detailed Description, which together serve to explain predetermined principles of the present invention.

BRIEF DESCRIPTION OF THE DRAWINGS

FIG. 2 is an operational chart of a power transmitting apparatus for a vehicle according to the various exemplary embodiments of the present invention.

FIG. 6 is an operational chart of a power transmitting apparatus for a vehicle according to the various exemplary embodiments of the present invention.

Figure 1:
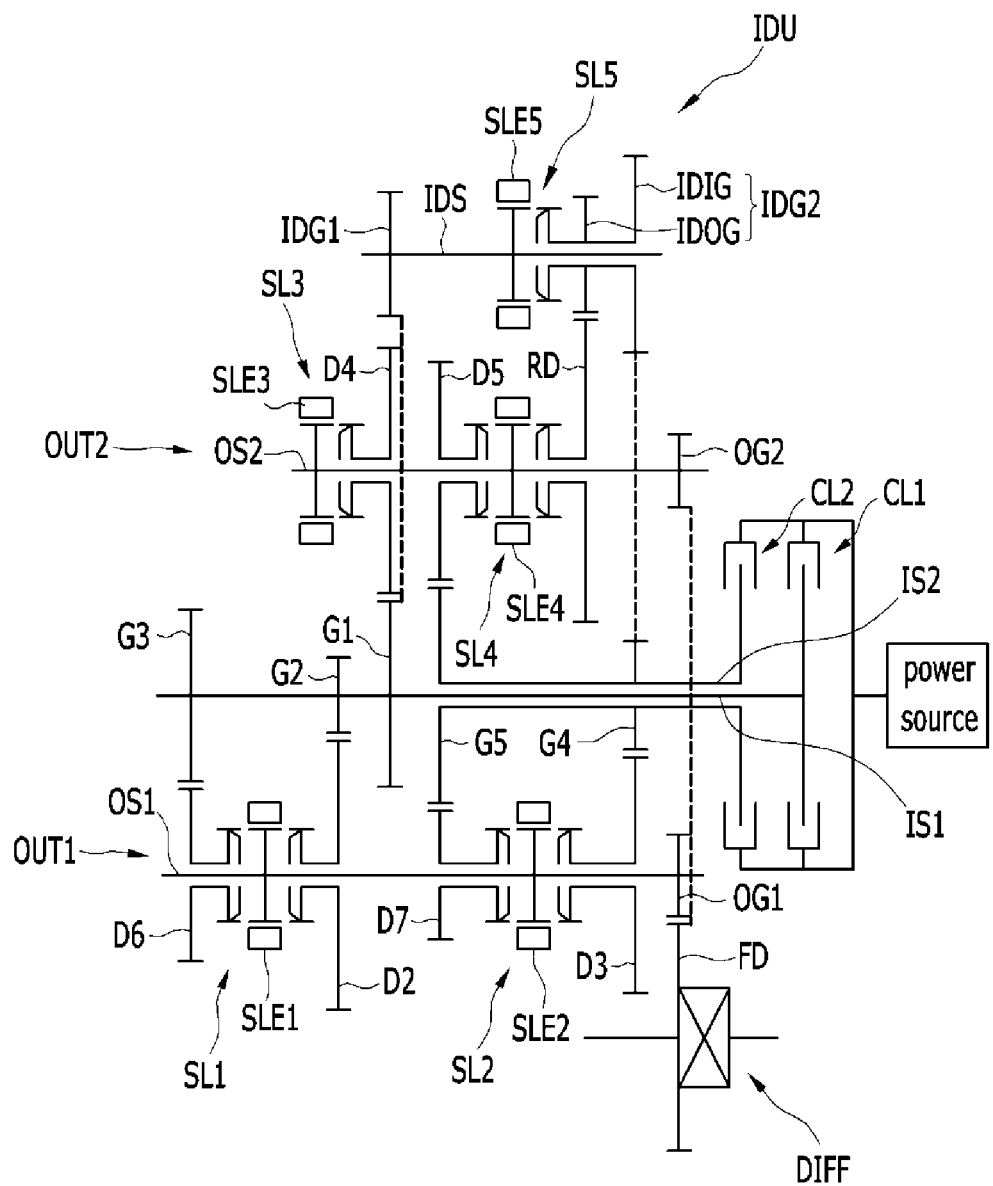
FIG. 1 is a schematic diagram of a power transmission apparatus for a vehicle according to the various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to a same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) may be intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and a same constituent elements are denoted by a same reference numerals in this specification.

In the detailed description, ordinal numbers are used for distinguishing constituent elements having a same terms, and have no specific meanings.

FIG. 1 is a schematic diagram of a power transmission apparatus for a vehicle according to the first exemplary embodiment of the present invention.

Referring to FIG. 1, a power transmission apparatus according to first exemplary embodiment of the present invention includes a first and second clutches CL1 and CL2 selectively transmitting torque of a power source or not, an input device including first and second input shafts IS1 and IS2, a speed output device changing and outputting toque input from the input device according to each gear stage and including first and second speed output units OUT1 and OUT2, and an idle module IDU disposed adjacent to the second speed output unit OUT2.

The first and second clutches CL1 and CL2 selectively transmit the torque of the power source to the first and second input shafts IS1 and IS2, respectively.

The first clutch CL1 selectively transmits the torque of the power source to the first input shaft IS1, and the second clutch CL2 selectively transmits the torque of the power source to the second input shaft IS2.

Herein, the power source may be any device that supplies torque to the power transmission apparatus, such as an engine, a motor/generator, and so on. For better comprehension and ease of description, it is exemplified in the exemplary embodiments of the present invention that the power source is an engine.

The first and second clutches CL1 and CL2 may be conventional multi-plate clutches of wet type, but are not limited to this. The first and second clutches CL1 and CL2 may be conventional multi-plate clutches of dry type. The first and second clutches CL1 and CL2 may be controlled by a hydraulic control system.

The input device includes the first input shaft IS1 selectively connected to an output side of the engine through the first clutch CL1, and the second input shaft IS2 being a hollow shaft, enclosing the first input shaft IS1, and selectively connected to the output side of the engine through the second clutch CL2.

First, second, and third input gears G1, G2, and G3 are fixedly disposed on the first input shaft IS1. The first, second, and third input gears G1, G2, and G3 are disposed on a rear portion of the first input shaft IS1 penetrating through the second input shaft IS2, and are sequentially disposed from the front to the rear.

Fourth and fifth input gears G4 and G5 are fixedly disposed on the second input shaft IS2. The fourth input gear G4 is disposed on a front portion of the second input shaft IS2 and the fifth input gear G5 is disposed on a rear portion of the second input shaft IS2.

Therefore, the first input shaft IS1 and the first, second, and third input gears G1, G2, and G3 fixedly disposed thereon are rotated when the first clutch CL1 is operated, and the second input shaft IS2 and the fourth and fifth input gears G4 and G5 fixedly disposed thereon are rotated when the second clutch CL2 is operated.

The first, second, third, fourth, and fifth input gears G1, G2, G3, G4, and G5 are input gears operating at each gear stage. The first input gear G1 is operated at a fourth forward speed, the second input gear G2 is operated at a second forward speed, and the third input gear G3 is operated at a sixth forward speed.

In addition, the fourth input gear G4 is operated at a third forward speed and a reverse speed, and the fifth input gear G5 is operated at a fifth forward speed and a seventh forward speed.

The input gears G1, G2, and G3 for achieving even-numbered gear stages are disposed on the first input shaft IS1, and the input gears G5 and G6 for achieving odd-numbered gear stages are disposed on the second input shaft IS2.

The speed output device includes first and second speed output units OUT1 and OUT2 disposed in parallel with and apart from the first and second input shafts IS1 and IS2.

The first speed output unit OUT1 includes a first output shaft OS1 disposed in parallel with and apart from the first and second input shafts IS1 and IS2.

A second speed gear D2 and a sixth speed gear D6 are rotatably disposed on the first output shaft OS1, and a first synchronizer SL1 selectively connecting the second speed gear D2 or the sixth speed gear D6 to the first output shaft OS1 is disposed on the first output shaft OS1. In addition, a third speed gear D3 and a seventh speed gear D7 are rotatably disposed on the first output shaft OS1, and a second synchronizer SL2 selectively connecting the third speed gear D3 or the seventh speed gear D7 to the first output shaft OS1 is disposed on the first output shaft OS1. A first output gear OG1 is fixedly disposed on a front portion of the first output shaft OS1.

The first synchronizer SL1 is disposed on a rear portion of the first output shaft OS1 and the second synchronizer SL2 is disposed on the front portion of the first output shaft OS1.

The second speed gear D2 is engaged with the second input gear G2 and the sixth speed gear D6 is engaged with the third input gear G3.

The third speed gear D3 is engaged with the fourth input gear G4 and the seventh speed gear D7 is engaged with the fifth input gear G5.

In addition, the first output gear OG1 outputs torque transmitted from the first output shaft OS1 to a differential apparatus DIFF through a final reduction gear FD.

The second speed output unit OUT2 includes a second output shaft OS2 disposed in parallel with and apart from the first and second input shafts IS1 and IS2.

A fourth speed gear D4 is rotatably disposed on the second output shaft OS2, and a third synchronizer SL3 selectively connecting the fourth speed gear D4 to the second output shaft OS2 is disposed on the second output shaft OS2. In addition, a fifth speed gear D5 and a reverse speed gear RD are rotatably disposed on the second output shaft OS2, and a fourth synchronizer SL4 selectively connecting the fifth speed gear D5 or the reverse speed gear RD to the second output shaft OS2 is disposed on the second output shaft OS2. A second output gear OG2 is fixedly disposed on a front portion of the second output shaft OS2.

The third synchronizer SL3 is disposed on a rear portion of the second output shaft OS2 and the fourth synchronizer SL4 is disposed on a front portion of the second output shaft OS2.

The fourth speed gear D4 is engaged with the first input gear G1 and the fifth speed gear D5 is engaged with the fifth input gear G5.

The second output gear OG2 outputs torque transmitted from the second output shaft OS2 to the differential apparatus DIFF through the final reduction gear FD.

Herein, the first output gear OG1 and the second output gear OG2 are engaged to the final reduction gear FD to transmit the torque of the first output shaft OS1 or second output shaft OS2 to the final reduction gear FD. The torque transmitted to the final reduction gear FD is transmitted to a driving wheel through the differential apparatus DIFF.

The idle module IDU includes an idle shaft IDS disposed in parallel with the second output shaft OS2.

A first idle gear IDG1 and a second idle gear IDG2 are disposed on the idle shaft IDS. The first idle gear IDG1 is fixedly disposed on the idle shaft IDS and the second idle gear IDG2 is rotatably disposed on the idle shaft IDS.

In addition, the first idle gear IDG1 is engaged with the first input gear G1 on the first input shaft IS1.

The second idle gear IDS2 includes an idle input gear IDIG and an idle output gear IDOG integrally formed with each other and having a distance in an axial direction therebetween. The idle input gear IDIG is engaged with the fourth input gear G4 on the second input shaft IS2 and the idle output gear IDOG is engaged with the reverse speed gear RD on the second output shaft OS2.

In addition, a fifth synchronizer SL5 for selectively connecting the second idle gear IDG2 to the idle shaft IDS is disposed on the idle shaft IDS.

Since the first, second, third, fourth, and fifth synchronizers SL1-SL5 are well known to a person of an ordinary skill in the art, detailed description thereof will be omitted. In addition, sleeves SLE1, SLE2, SLE3, SLE4, and SLE5 applied respectively to the first, second, third, fourth, and fifth synchronizers SL1-SL5, as well known to a person of an ordinary skill in the art, are operated by additional actuators and the actuators are controlled by a transmission control unit.

FIG. 2 is an operational chart of a power transmitting apparatus for a vehicle according to the first exemplary embodiment of the present invention.

[First Forward Speed]

Referring to FIG. 2, the second speed gear D2 and the first output shaft OS1 are operably connected through the sleeve SLE1 of the first synchronizer SL1, and the second idle gear IDG2 and the idle shaft IDS are operably connected through the sleeve SLE5 of the fifth synchronizer SL5 at the first forward speed. After that, when the second clutch CL2 is operated, shift to the first forward speed is achieved.

[Second Forward Speed]

Referring to FIG. 2, in a case that vehicle speed increases at the first forward speed and shift to the second forward speed is necessary, the second clutch CL2 is released and the sleeve SLE5 of the fifth synchronizer SL5 is moved to a neutral position. After that, when the first clutch CL1 is operated, the shift to the second forward speed is achieved.

[Third Forward Speed]

Referring to FIG. 2, in a case that the vehicle speed increases at the second forward speed and shift to the third forward speed is necessary, the first clutch CL1 is released and the sleeve SLE1 of the first synchronizer SL1 is moved to a neutral position. After that, when the third speed gear D3 and the first output shaft OS1 are operably connected through the sleeve SLE2 of the second synchronizer SL2 and the second clutch CL2 is operated, the shift to the third forward speed is achieved.

[Fourth Forward Speed]

Referring to FIG. 2, in a case that the vehicle speed increases at the third forward speed and shift to the fourth forward speed is necessary, the fourth speed gear D4 and the second output shaft OS2 are operably connected through the sleeve SLE3 of the third synchronizer SL3. After that, when the second clutch CL2 is released and the first clutch CL1 is operated, the shift to the fourth forward speed is achieved.

After the shift to the fourth forward speed is completed, the sleeve SLE2 of the second synchronizer SL2 is moved to a neutral position.

[Fifth Forward Speed]

Referring to FIG. 2, in a case that the vehicle speed increases at the fourth forward speed and shift to the fifth forward speed is necessary, the first clutch CL1 is released and the sleeve SLE3 of the third synchronizer SL3 is moved to a neutral position. After that, the fifth speed gear D5 and the second output shaft OS2 are operably connected through the sleeve SLE4 of the fourth synchronizer SL4. when the second clutch CL2 is operated, the shift to the fifth forward speed is achieved.

[Sixth Forward Speed]

Referring to FIG. 2, in a case that the vehicle speed increases at the fifth forward speed and shift to the sixth forward speed is necessary, the sixth speed gear D6 and the first output shaft OS1 are operably connected through the sleeve SLE1 of the first synchronizer SL1. After that, when the second clutch CL2 is released and the first clutch CL1 is operated, the shift to the sixth forward speed is achieved.

After the shift to the sixth forward speed is completed, the sleeve SLE4 of the fourth synchronizer SL4 is moved to a neutral position.

[Seventh Forward Speed]

Referring to FIG. 2, in a case that the vehicle speed increases at the sixth forward speed and shift to the seventh forward speed is necessary, the first clutch CL1 is released and the sleeve SLE1 of the first synchronizer SL1 is moved to a neutral position. After that, the seventh speed gear D7 and the first output shaft OS1 are operably connected through the sleeve SLE2 of the second synchronizer SL2. when the second clutch CL2 is operated, the shift to the seventh forward speed is achieved.

[Reverse Speed]

Referring to FIG. 2, the reverse speed gear RD and the second output shaft OS2 are operably connected through the sleeve SLE4 of the fourth synchronizer SL4. After that, when the second clutch CL2 is operated, shift to the reverse speed is achieved.

Figure 3:
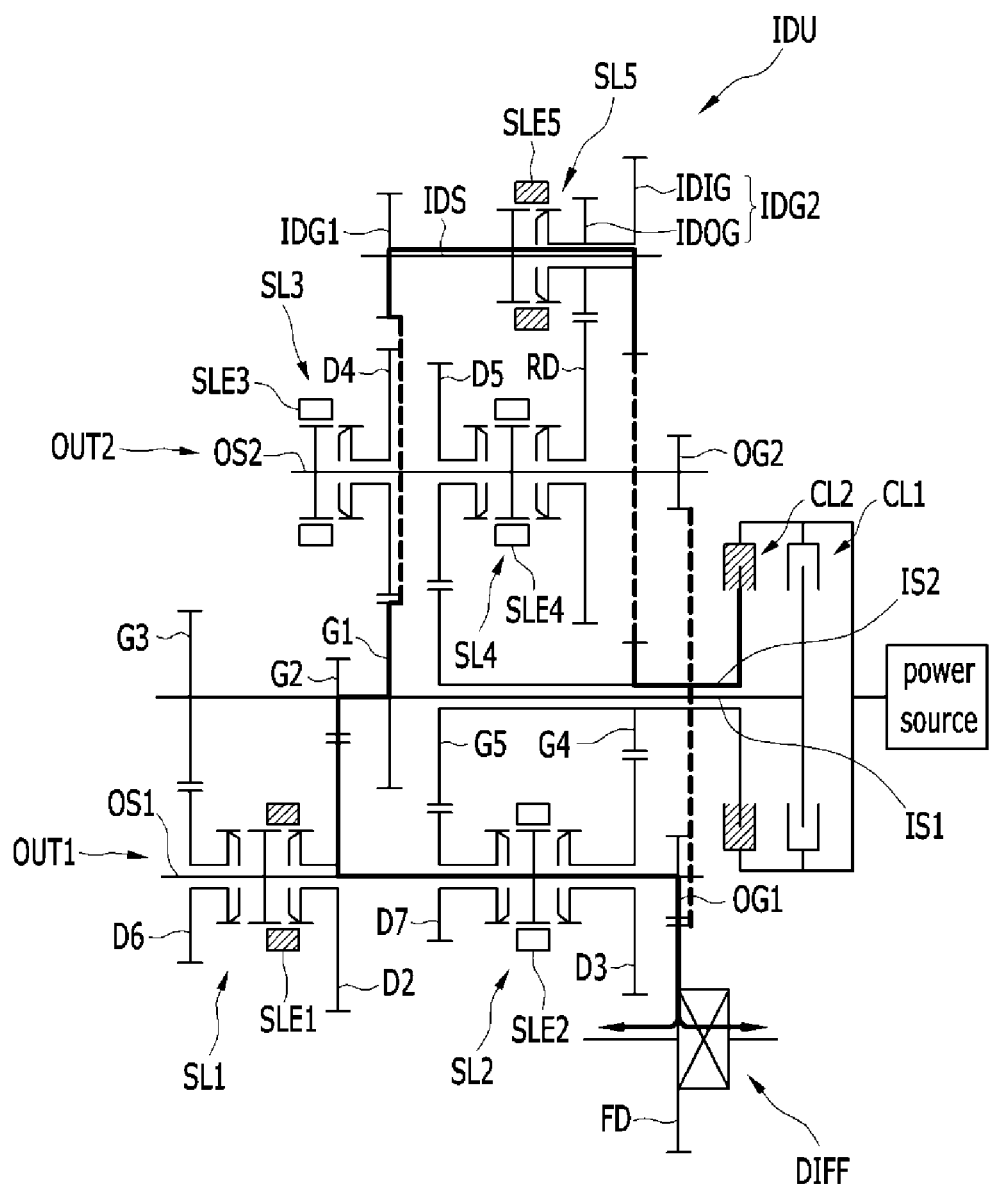
FIG. 3 is a schematic diagram for illustrating a power delivery path at a first forward speed in a power transmission apparatus for a vehicle according to the various exemplary embodiments of the present invention.

FIG. 3 is a schematic diagram for illustrating a power delivery path at a first forward speed in a power transmission apparatus for a vehicle according to the first exemplary embodiment of the present invention.

Referring to FIG. 2 and FIG. 3, for the shift to first forward speed, the second speed gear D2 and the first output shaft OS1 are operably connected through the sleeve SLE1 of the first synchronizer SL1 and the second idle gear IDG2 and the idle shaft IDS are operably connected through the sleeve SLE5 of the fifth synchronizer SL5. After that, the second clutch CL2 is operated.

In this case, the torque of the engine is sequentially transmitted to the second input shaft IS2, the fourth input gear G4, the second idle gear IDG2, the fifth synchronizer SL5, the first idle gear IDG1, the first input gear G1, the first input shaft IS1, the second input gear G2, the second speed gear D2, the first synchronizer SL1, the first output gear OG1, the final reduction gear FD and the differential apparatus DIFF.

Figure 4:
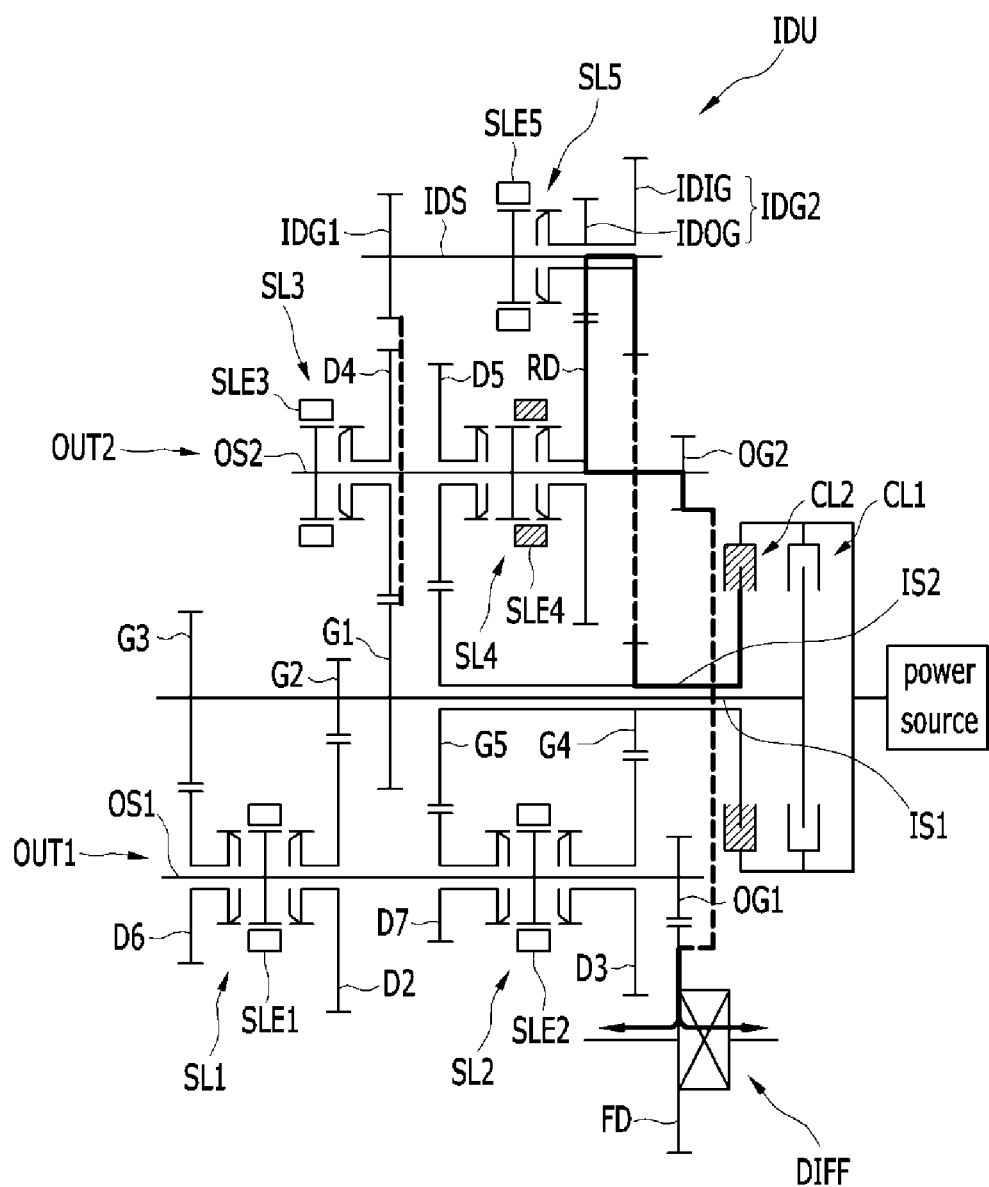
FIG. 4 is a schematic diagram for illustrating a power delivery path at a reverse speed in a power transmission apparatus for a vehicle according to the various exemplary embodiments of the present invention.

FIG. 4 is a schematic diagram for illustrating a power delivery path at a reverse speed in a power transmission apparatus for a vehicle according to the first exemplary embodiment of the present invention.

Referring to FIG. 2 and FIG. 4, for the shift to the reverse speed, the reverse speed gear RD and the second output shaft OS2 are operably connected through the sleeve SLE4 of the fourth synchronizer SL4. After that, the second clutch CL2 is operated.

In this case, the torque of the engine is sequentially transmitted to the second input shaft IS2, the fourth input gear G4, the second idle gear IDG2, the reverse speed gear RD, the fourth synchronizer SL4, the second output gear OG2, the final reduction gear FD and the differential apparatus DIFF.

In the power transmission apparatus according to the first exemplary embodiment of the present invention, two synchronizers SL1 and SL2 and the first output gear OG1 are disposed on the first output shaft OS1, two synchronizers SL3 and SL4 and the second output gear OG2 are disposed on the second output shaft OS2, and one synchronizer SL5 involved in the first forward speed is disposed on an additional idle shaft IDS.

Therefore, seven forward speeds may be achieved without changing in a length of the power transmission apparatus.

Figure 5:
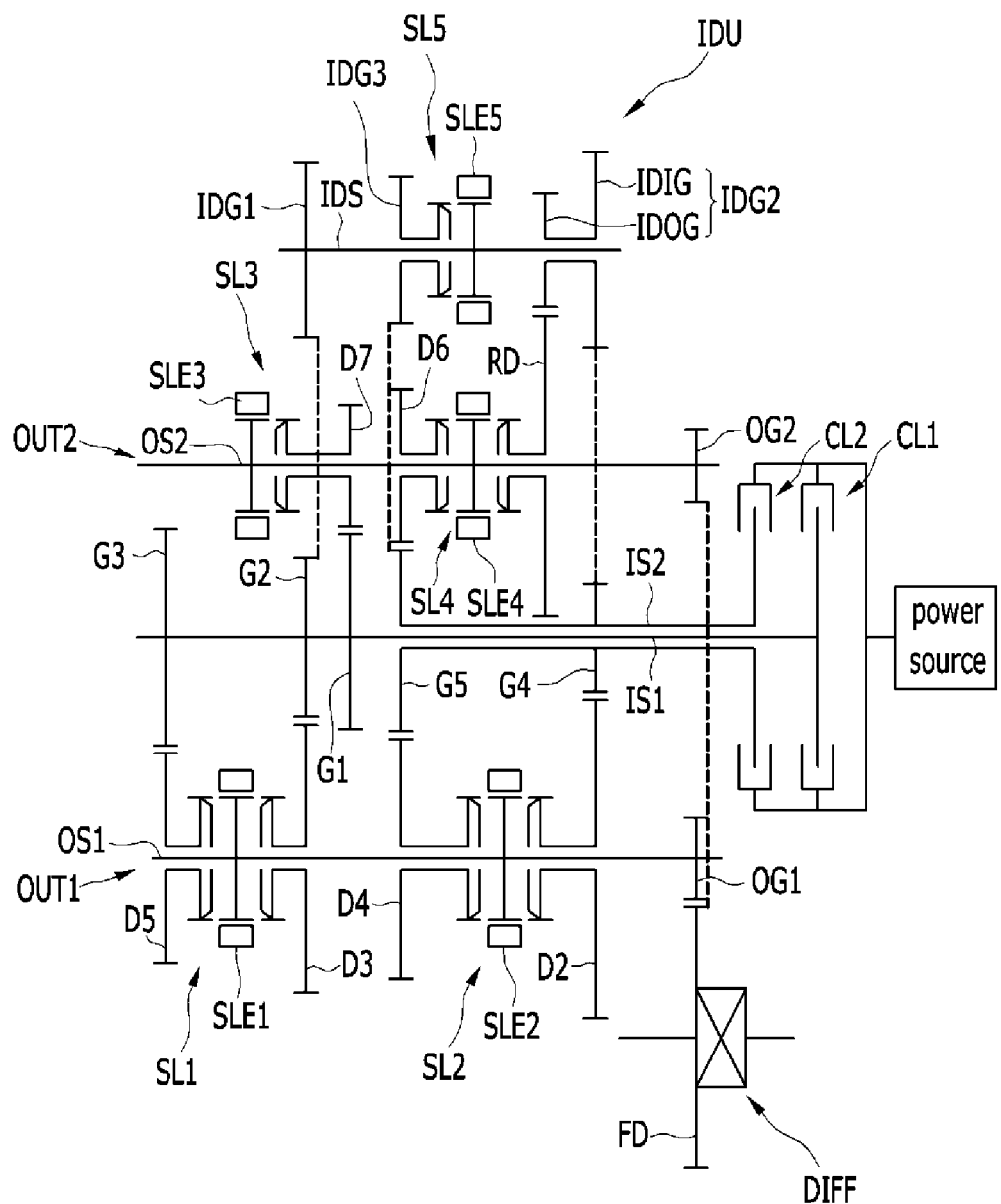
FIG. 5 is a schematic diagram of a power transmission apparatus for a vehicle according to the various exemplary embodiments of the present invention.

FIG. 5 is a schematic diagram of a power transmission apparatus for a vehicle according to the second exemplary embodiment of the present invention.

Referring to FIG. 5, a power transmission apparatus for a vehicle according to the second exemplary embodiment of the present invention is similar to that according to the first exemplary embodiment. Particularly, the power transmission apparatus according to the second exemplary embodiment includes a selective connection unit including the first and second clutches CL1 and CL2, the input device including the first and second input shafts IS1 and IS2, a speed output device changing and outputting toque input from the input device according to each gear stage and including first and second speed output units OUT1 and OUT2, and an idle module IDU disposed adjacent to the second speed output unit OUT2.

Differences between the first exemplary embodiment and the second exemplary embodiment are the speed output device and the idle module.

The speed output device includes the first and second speed output units OUT1 and OUT2 disposed in parallel with and apart from the first and second input shafts IS1 and IS2.

The first speed output unit OUT1 includes the first output shaft OS1 disposed in parallel with and apart from the first and second input shafts IS1 and IS2.

The third speed gear D3 and the fifth speed gear D5 are rotatably disposed on the first output shaft OS1, and the first synchronizer SL1 selectively connecting the third speed gear D3 or the fifth speed gear D5 to the first output shaft OS1 is disposed on the first output shaft OS1. In addition, the second speed gear D2 and the fourth speed gear D4 are rotatably disposed on the first output shaft OS1, and the second synchronizer SL2 selectively connecting the second speed gear D2 or the fourth speed gear D4 to the first output shaft OS1 is disposed on the first output shaft OS1. The first output gear OG1 is fixedly disposed on the front portion of the first output shaft OS1.

The first synchronizer SL1 is disposed on the rear portion of the first output shaft OS1 and the second synchronizer SL2 is disposed on the front portion of the first output shaft OS1.

The third speed gear D3 is engaged with the second input gear G2 and the fifth speed gear D5 is engaged with the third input gear G3.

The second speed gear D2 is engaged with the fourth input gear G4 and the fourth speed gear D4 is engaged with the fifth input gear G5.

In addition, the first output gear OG1 outputs torque transmitted from the first output shaft OS1 to the differential apparatus DIFF through the final reduction gear FD.

The second speed output unit OUT2 includes the second output shaft OS2 disposed in parallel with and apart from the first and second input shafts IS1 and IS2.

The seventh speed gear D7 is rotatably disposed on the second output shaft OS2, and the third synchronizer SL3 selectively connecting the seventh speed gear D7 to the second output shaft OS2 is disposed on the second output shaft OS2. In addition, the sixth speed gear D6 and the reverse speed gear RD are rotatably disposed on the second output shaft OS2, and the fourth synchronizer SL4 selectively connecting the sixth speed gear D6 or the reverse speed gear RD to the second output shaft OS2 is disposed on the second output shaft OS2. The second output gear OG2 is fixedly disposed on the front portion of the second output shaft OS2.

The third synchronizer SL3 is disposed on THE rear portion of the second output shaft OS2 and the fourth synchronizer SL4 is disposed on the front portion of the second output shaft OS2.

The seventh speed gear D7 is engaged with the first input gear G1 and the sixth speed gear D6 is engaged with the fifth input gear G5.

The second output gear OG2 outputs torque transmitted from the second output shaft OS2 to the differential apparatus DIFF through the final reduction gear FD.

Herein, the first output gear OG1 and the second output gear OG2 are engaged to the final reduction gear FD to transmit the torque of the first output shaft OS1 or second output shaft OS2 to the final reduction gear FD. The torque transmitted to the final reduction gear FD is transmitted to a driving wheel through the differential apparatus DIFF.

The idle module IDU includes the idle shaft IDS disposed in parallel with the second output shaft OS2.

First, second, and third idle gears IDG1, IDG2, and IDG3 are disposed on the idle shaft IDS. The first idle gear IDG1 is fixedly disposed on the idle shaft IDS, the second idle gear IDG2 is rotatably disposed on the idle shaft IDS, and the third idle gear IDG3 is rotatably disposed on the idle shaft IDS.

The first idle gear IDG1 is engaged with the second input gear G2 on the first input shaft IS1.

The second idle gear IDS2 includes the idle input gear IDIG and the idle output gear IDOG integrally formed with each other and having a distance in the axial direction therebetween. The idle input gear IDIG is engaged with the fourth input gear G4 on the second input shaft IS2 and the idle output gear IDOG is engaged with the reverse speed gear RD on the second output shaft OS2.

The third idle gear IDG3 is disposed on the first and second idle gears IDG1 and IDG2, is engaged with the fifth input gear G5 on the second input shaft IS2, is selectively connected to the idle shaft IDS through the fifth synchronizer SL5.

FIG. 6 is an operational chart of a power transmitting apparatus for a vehicle according to the second exemplary embodiment of the present invention.

[First Forward Speed]

Referring to FIG. 6, the second speed gear D2 and the first output shaft OS1 are operably connected through the sleeve SLE2 of the second synchronizer SL2 and the third idle gear IDG3 and the idle shaft IDS are operably connected through the sleeve SLE5 of the fifth synchronizer SL5 at the first forward speed. After that, when the first clutch CL1 is operated, the shift to the first forward speed is achieved.

[Second Forward Speed]

Referring to FIG. 6, in a case that the vehicle speed increases at the first forward speed and the shift to the second forward speed is necessary, the first clutch CL1 is released and the sleeve SLE5 of the fifth synchronizer SL5 is moved to a neutral position. After that, when the second clutch CL2 is operated, the shift to the second forward speed is achieved.

[Third Forward Speed]

Referring to FIG. 6, in a case that the vehicle speed increases at the second forward speed and the shift to the third forward speed is necessary, the second clutch CL2 is released, the second synchronizer SL2 is moved to a neutral position, and the third speed gear D3 and the first output shaft OS1 are operably connected through the sleeve SLE1 of the first synchronizer SL1. After that, when the first clutch CL1 is operated, the shift to the third forward speed is achieved.

[Fourth Forward Speed]

Referring to FIG. 6, in a case that the vehicle speed increases at the third forward speed and the shift to the fourth forward speed is necessary, the first clutch CL1 is released, the first synchronizer SL1 is moved to a neutral position, and the fourth speed gear D4 and the first output shaft OS1 are operably connected through the sleeve SLE2 of the second synchronizer SL2. After that, when the second clutch CL2 is operated, the shift to the fourth forward speed is achieved.

[Fifth Forward Speed]

Referring to FIG. 6, in a case that the vehicle speed increases at the fourth forward speed and the shift to the fifth forward speed is necessary, the second clutch CL2 is released, the sleeve SLE2 of the second synchronizer SL2 is moved to a neutral position, and the fifth speed gear D5 and the first output shaft OS1 are operably connected through the sleeve SLE1 of the first synchronizer SL1. After that, when the first clutch CL1 is operated, the shift to the fifth forward speed is achieved.

[Sixth Forward Speed]

Referring to FIG. 6, in a case that the vehicle speed increases at the fifth forward speed and the shift to the sixth forward speed is necessary, the sixth speed gear D6 and the second output shaft OS2 are operably connected through the sleeve SLE4 of the fourth synchronizer SL4. After that, when the first clutch CL1 is released and the second clutch CL2 is operated, the shift to the sixth forward speed is achieved.

After the shift to the sixth forward speed is completed, the sleeve SLE1 of the first synchronizer SL1 is moved to a neutral position.

[Seventh Forward Speed]

Referring to FIG. 6, in a case that the vehicle speed increases at the sixth forward speed and the shift to the seventh forward speed is necessary, the second clutch CL2 is released, the sleeve SLE4 of the fourth synchronizer SL4 is moved to a neutral position, and the seventh speed gear D7 and the second output shaft OS2 are operably connected through the sleeve SLE3 of the third synchronizer SL3. After that, when the first clutch CL1 is operated, the shift to the seventh forward speed is achieved.

[First Reverse Speed]

Referring to FIG. 6, the reverse speed gear RD and the second output shaft OS2 are operably connected through the sleeve SLE4 of the fourth synchronizer SL4 and the third idle gear IDG3 and the idle shaft IDS are operably connected through the sleeve SLE5 of the fifth synchronizer SL5 at a first reverse speed. After that, when the first clutch CL1 is operated, shift to the first reverse speed is achieved.

[Second Reverse Speed]

Referring to FIG. 6, in a case that the vehicle speed increases at the first reverse speed and shift to a second reverse speed is necessary, the first clutch CL1 is released and the sleeve SLE5 of the fifth synchronizer SL5 is moved to a neutral position. After that, when the second clutch CL2 is operated, the shift to the second reverse speed is achieved.

Figure 7:
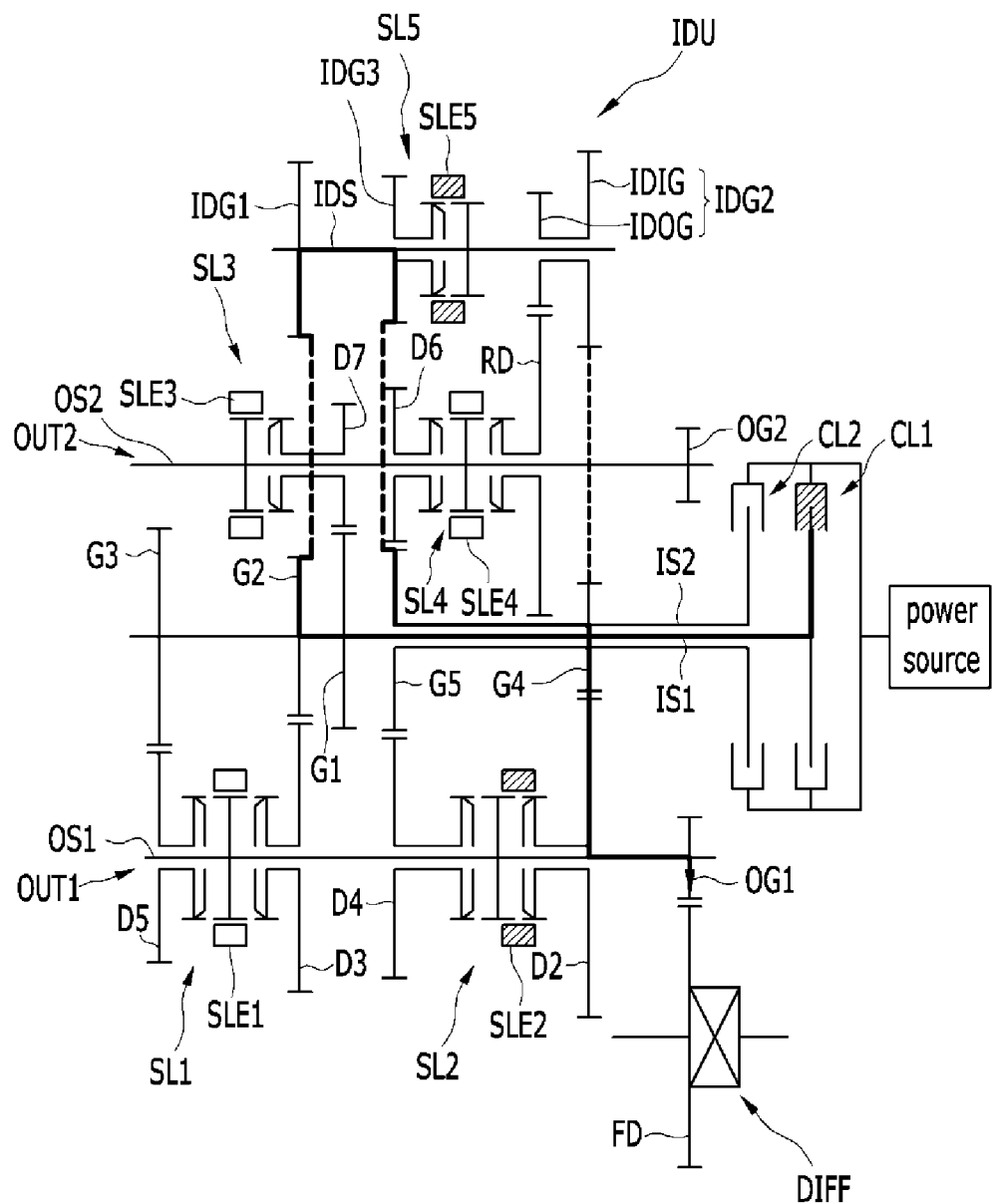
FIG. 7 is a schematic diagram for illustrating a power delivery path at a first forward speed in a power transmission apparatus for a vehicle according to the various exemplary embodiments of the present invention.

FIG. 7 is a schematic diagram for illustrating a power delivery path at a first forward speed in a power transmission apparatus for a vehicle according to the second exemplary embodiment of the present invention.

Referring to FIG. 6 and FIG. 7, for the shift to the first forward speed, the second speed gear D2 and the first output shaft OS1 are operably connected through the sleeve SLE2 of the second synchronizer SL2 and the third idle gear IDG3 and the idle shaft IDS are operably connected through the sleeve SLE5 of the fifth synchronizer SL5. After that, when the first clutch CL1 is operated, the shift to the first forward speed is achieved.

In this case, the torque of the engine is sequentially transmitted to the first input shaft IS1, the second input gear G2, the first idle gear IDG1, the fifth synchronizer SL5, the third idle gear IDG3, the fifth input gear G5, the second input shaft IS2, the fourth input gear G4, the second speed gear D2, the second synchronizer SL2, the first output gear OG1, the final reduction gear FD, and the differential apparatus DIFF.

Figure 8:
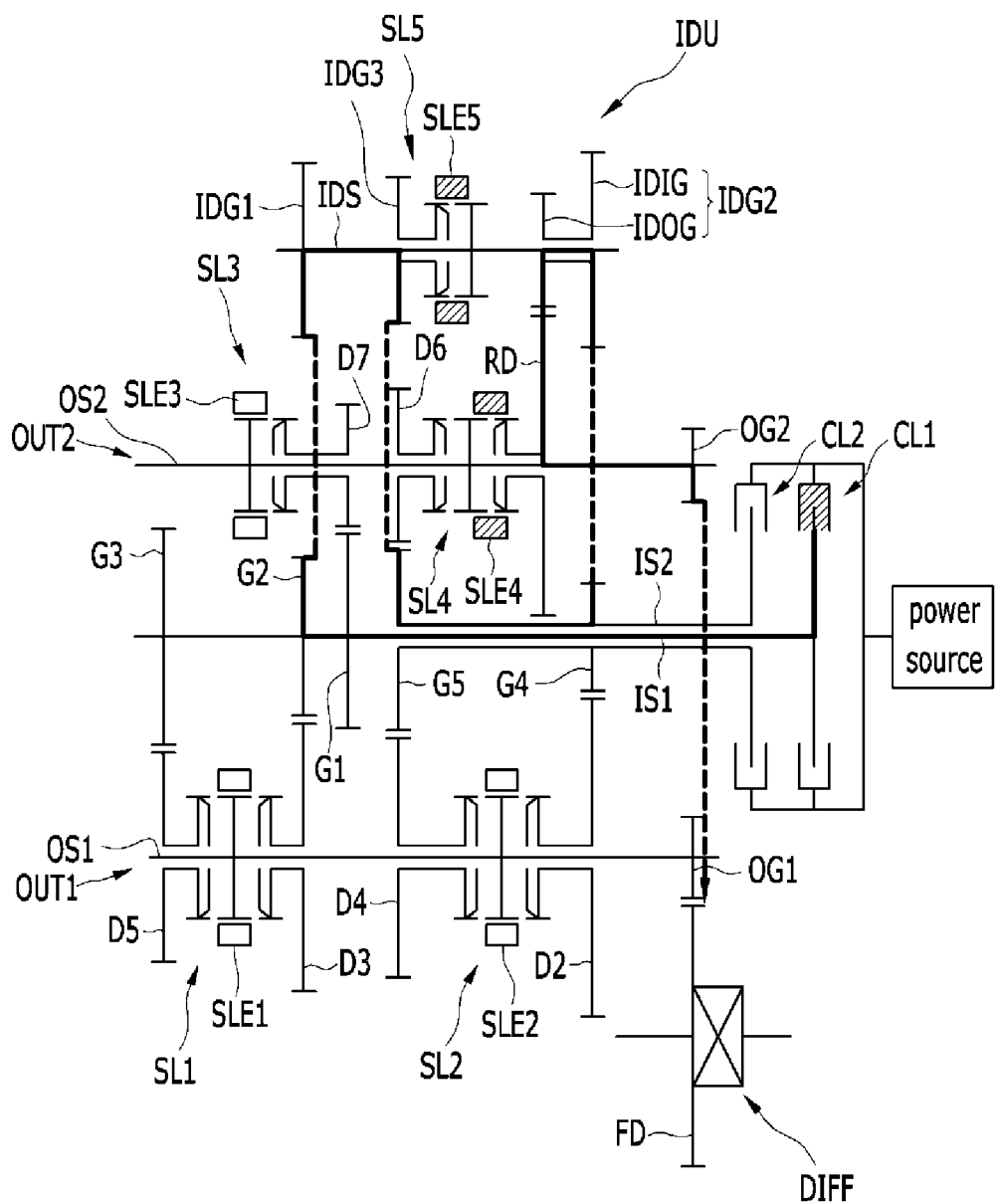
FIG. 8 is a schematic diagram for illustrating a power delivery path at a first reverse speed in a power transmission apparatus for a vehicle according to the various exemplary embodiments of the present invention.

FIG. 8 is a schematic diagram for illustrating a power delivery path at a first reverse speed in a power transmission apparatus for a vehicle according to the second exemplary embodiment of the present invention.

Referring to FIG. 6 and FIG. 8, for the shift to the first reverse speed, the reverse speed gear RD and the second output shaft OS2 are operably connected through the sleeve SLE4 of the fourth synchronizer SL4 and the third idle gear IDG3 and the idle shaft IDS are operably connected through the sleeve SLE5 of the fifth synchronizer SL5. After that, when the first clutch CL1 is operated, the shift to the first reverse speed is achieved.

In this case, the torque of the engine is sequentially transmitted to the first input shaft IS1, the second input gear G2, the first idle gear IDG1, the fifth synchronizer SL5, the third idle gear IDG3, the fifth input gear G5, the second input shaft IS2, the fourth input gear G4, the second idle gear IDG2, the reverse speed gear RD, the second output gear OG2, the final reduction gear FD, and the differential apparatus DIFF.

Figure 9:
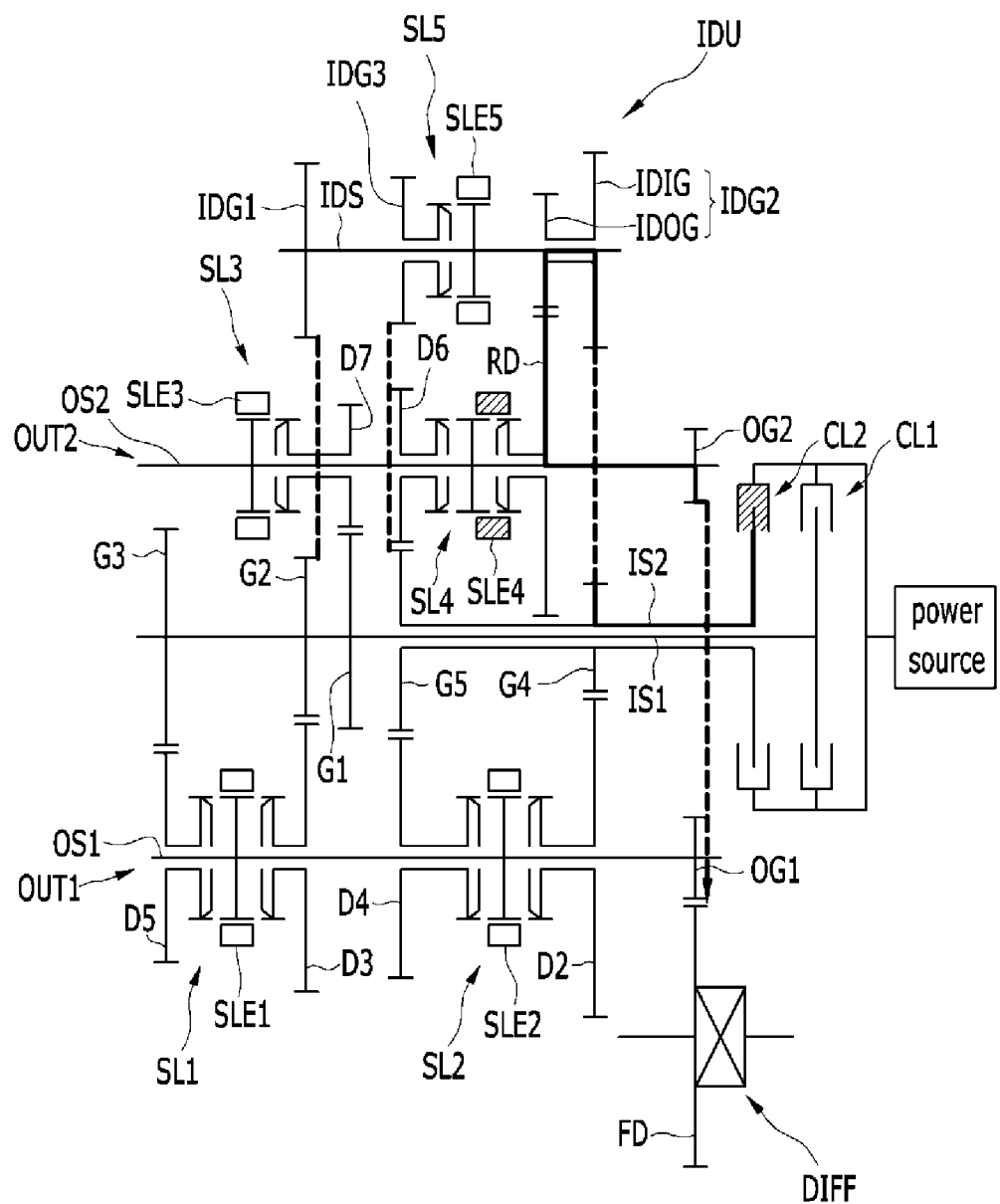
FIG. 9 is a schematic diagram for illustrating a power delivery path at a second reverse speed in a power transmission apparatus for a vehicle according to the various exemplary embodiments of the present invention.

FIG. 9 is a schematic diagram for illustrating a power delivery path at a second reverse speed in a power transmission apparatus for a vehicle according to the second exemplary embodiment of the present invention.

Referring to FIG. 6 and FIG. 9, for the shift to the second reverse speed, the reverse speed gear RD and the second output shaft OS2 are operably connected through the sleeve SLE4 of the fourth synchronizer SL4. After that, when the second clutch CL2 is operated, the shift to the second reverse speed is achieved.

Therefore, the torque of the engine is sequentially transmitted to the second input shaft IS2, the fourth input gear G4, the second idle gear IDG2, the reverse speed gear RD, the fourth synchronizer SL4, the second output gear OG2, the final reduction gear FD, and the differential apparatus DIFF.

Figure 10:
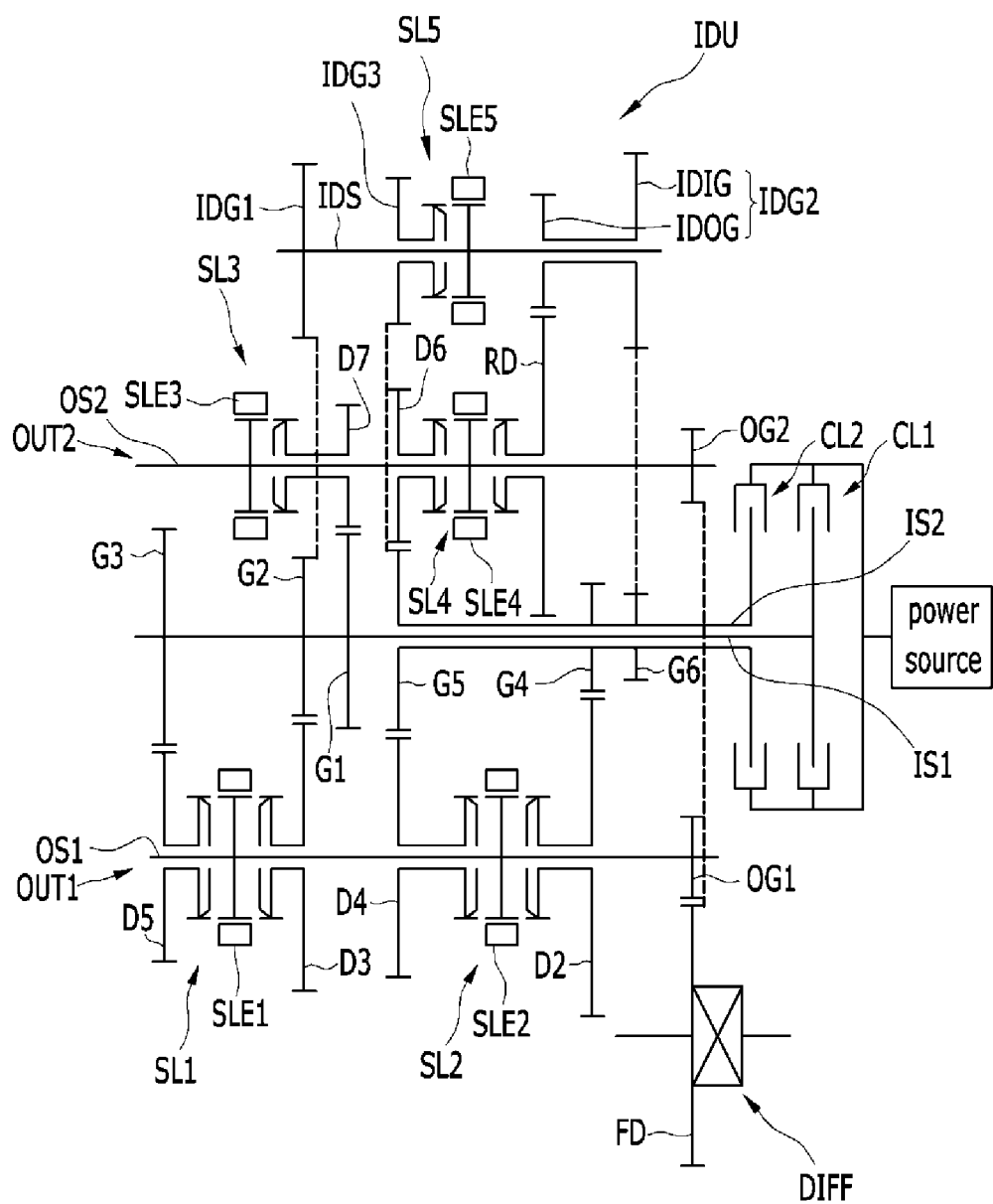
FIG. 10 is a schematic diagram of a power transmission apparatus for a vehicle according to the various exemplary embodiments of the present invention.

FIG. 10 is a schematic diagram of a power transmission apparatus for a vehicle according to the second exemplary embodiment of the present invention.

Referring to FIG. 10, a power transmission apparatus for a vehicle according to the third exemplary embodiment of the present invention is similar to that according to the second exemplary embodiment, but differences therebetween are that a sixth input gear G6 is additionally disposed on the front portion of the second input shaft IS2 and is engaged with the idle input gear IDIG of the second idle gear IDG2.

Since structure and functions of the third exemplary embodiment are a same as those of the second exemplary embodiment except the differences, detailed description thereof will be omitted.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmission apparatus for a vehicle comprising:
   a first input shaft having at least one input gear fixedly disposed on an exterior circumference thereof and is selectively connected to a power source through a first clutch;
   a second input shaft having at least one input gear fixedly disposed on an exterior circumference thereof and is selectively connected to the power source through a second clutch;
   a first speed output unit including a first output shaft disposed in parallel with the first and second input shafts and at least one speed gear engaged with the at least one input gear on the first and second input shafts and rotatably disposed on the first output shaft, and changing and outputting torque transmitted from the first input shaft or the second input shaft by connecting the at least one speed gear to the first output shaft;
   a second speed output unit including a second output shaft disposed in parallel with the first and second input shafts and at least one speed gear engaged with the at least one input gear on the first and second input shafts and rotatably disposed on the second output shaft, and changing and outputting torque transmitted from the first input shaft or second input shaft by connecting the at least one speed gear to the second output shaft; and
   an idle module including at least two idle gears on an idle shaft disposed in parallel with the first and second input shafts, wherein one of the idle gears is engaged with one input gear on the first input shaft, another of the idle gears is engaged with one input gear on the second input shaft, and one of the idle gears engaged with the input gears is selectively connected to the idle shaft
   wherein first, second, and third input gears are fixedly disposed on the first input shaft, and fourth and fifth input gears are fixedly disposed on the second input shaft,
   wherein the first speed output unit includes:
      the first output shaft disposed in parallel with and apart from the first and second input shafts;
      a second speed gear rotatably disposed on the first output shaft and engaged with the second input gear;
      a sixth speed gear rotatably disposed on the first output shaft and engaged with the third input gear;
      a first synchronizer selectively connecting the second speed gear or the sixth speed gear to the first output shaft;

a third speed gear rotatably disposed on the first output shaft and engaged with the fourth input gear;
a seventh speed gear rotatably disposed on the first output shaft and engaged with the fifth input gear;
a second synchronizer selectively connecting the third speed gear or the seventh speed gear to the first output shaft; and
a first output gear fixedly disposed on the first output shaft,
wherein the second speed output unit comprises:
the second output shaft disposed in parallel with and apart from the first and second input shafts;
a fourth speed gear rotatably disposed on the second output shaft and engaged with the first input gear;
a third synchronizer selectively connecting the fourth speed gear to the second output shaft;
a fifth speed gear rotatably disposed on the second output shaft and engaged with the fifth input gear;
a reverse speed gear rotatably disposed on the second output shaft
a fourth synchronizer selectively connecting the fifth speed gear or the reverse speed gear to the second output shaft; and
a second output gear fixedly disposed on the second output shaft,
wherein the idle module comprises:
the idle shaft disposed in parallel with and apart from the first and second input Shafts;
a first idle gear fixedly disposed on a first end portion of the idle shaft and engaged with one input gear on the first input shaft;
a second idle gear including an idle input gear and an idle output gear integrally formed with each other and rotatably disposed on a second end portion of the idle shaft, wherein the idle input gear is engaged with one input gear on the second input shaft and the idle output gear is engaged with the reverse speed gear disposed on one of the first and second output shafts; and
a fifth synchronizer selectively connecting the second idle gear to the idle shaft,
wherein the first idle gear is engaged with the first input gear on the first input shaft,
the idle input gear of the second idle gear is engaged with the fourth input gear on the second input shaft, and
the idle output gear of the second idle gear is engaged with the reverse speed gear on the second output shaft, and
wherein the fifth synchronizer selectively connects the idle output gear of the second idle gear to the idle shaft.

2. A power transmission apparatus for a vehicle comprising:
a first input shaft having at least one input gear fixedly disposed on an exterior circumference thereof and is selectively connected to a power source through a first clutch;
a second input shaft having at least one input gear fixedly disposed on an exterior circumference thereof and is selectively connected to the power source through a second clutch;
a first speed output unit including a first output shaft disposed in parallel with the first and second input shafts and at least one speed gear engaged with the at least one input gear on the first and second input shafts and rotatably disposed on the first output shaft, and changing and outputting torque transmitted from the first input shaft or the second input shaft by connecting the at least one speed gear to the first output shaft;
a second speed output unit including a second output shaft disposed in parallel with the first and second input shafts and at least one speed gear engaged with the at least one input gear on the first and second input shafts and rotatably disposed on the second output shaft, and changing and outputting torque transmitted from the first input shaft or second input shaft by connecting the at least one speed gear to the second output shaft; and
an idle module including at least two idle gears on an idle shaft disposed in parallel with the first and second input shafts, wherein one of the idle gears is engaged with one input gear on the first input shaft, another of the idle gears is engaged with one input gear on the second input shaft, and one of the idle gears engaged with the input gears is selectively connected to the idle shaft,
wherein first, second, and third input gears are fixedly disposed on the first input shaft, and fourth and fifth input gears are fixedly disposed on the second input shaft,
wherein the first speed output unit comprises:
the first output shaft disposed in parallel with and apart from the first and second input shafts;
a third speed gear rotatably disposed on the first output shaft and engaged with the second input gear;
a fifth speed gear rotatably disposed on the first output shaft and engaged with the third input gear;
a first synchronizer selectively connecting the third speed gear or the fifth speed gear to the first output shaft;
a second speed gear rotatably disposed on the first output shaft and engaged with the fourth input gear;
a fourth speed gear rotatably disposed on the first output shaft and engaged with the fifth input gear;
a second synchronizer selectively connecting the second speed gear or the fourth speed gear to the first output shaft; and
a first output gear fixedly disposed on the first output shaft,
wherein the second speed output unit comprises:
the second output shaft disposed in parallel with and apart from the first and second input shafts;
a seventh speed gear rotatably disposed on the second output shaft and engaged with the first input gear;
a third synchronizer selectively connecting the seventh speed gear to the second output shaft;
a sixth speed gear rotatably disposed on the second output shaft and engaged with the fifth input gear;
a reverse speed gear rotatably disposed on the second output shaft;
a fourth synchronizer selectively connecting the sixth speed gear or the reverse speed gear to the second output shaft; and
a second output gear fixedly disposed on the second output shaft,
wherein the idle module comprises:
the idle shaft disposed in parallel with and apart from the first and second input shafts:
a first idle gear fixedly disposed on a first end portion of the idle shaft and engaged with one input gear on the first input shaft;
a second idle gear including an idle input gear and an idle output gear integrally formed with each other and rotatably disposed on a second end portion of the idle shaft, wherein the idle input gear is engaged with one input gear on the second input shaft and the idle output gear is engaged with the reverse speed gear disposed on one of the first and second output shafts;

a third idle gear rotatably disposed on the idle shaft and engaged with one input gear on the second input shaft; and a fifth synchronizer selectively connecting the third idle gear to the idle shaft, and wherein the first idle gear is engaged with the second input gear on the first input shaft, the idle input gear of the second idle gear is engaged with the fourth input gear on the second input shaft, the idle output gear of the second idle gear is engaged with the reverse speed gear on the second output shaft, and the third idle gear is engaged with the fifth input gear on the second input shaft.

3. A power transmission apparatus for a vehicle comprising:

a first input shaft having at least one input gear fixedly disposed on an exterior circumference thereof and is selectively connected to a power source through a first clutch;

a second input shaft having at least one input gear fixedly disposed on an exterior circumference thereof and is selectively connected to the power source through a second clutch;

a first speed output unit including a first output shaft disposed in parallel with the first and second input shafts and at least one speed gear engaged with the at least one input gear on the first and second input shafts and rotatably disposed on the first output shaft, and changing and outputting torque transmitted from the first input shaft or the second input shaft by connecting the at least one speed gear to the first output shaft;

a second speed output unit including a second output shaft disposed in parallel with the first and second input shafts and at least one speed gear engaged with the at least one input gear on the first and second input shafts and rotatably disposed on the second output shaft, and changing and outputting torque transmitted from the first input shaft or second input shaft by connecting the at least one speed gear to the second output shaft; and an idle module including at least two idle gears on an idle shaft disposed in parallel with the first and second input shafts, wherein one of the idle gears is engaged with one input gear on the first input shaft, another of the idle gears is engaged with one input gear on the second input shaft, and one of the idle gears engaged with the input gears is selectively connected to the idle shaft, wherein first, second, and third input gears are fixedly disposed on the first input shaft, and fourth, fifth, and sixth input gears are fixedly disposed on the second input shaft, wherein the first speed output unit comprises:

the first output shaft disposed in parallel with and apart from the first and second input shafts;

a third speed gear rotatably disposed on the first output shaft and engaged with the second input gear;

a fifth speed gear rotatably disposed on the first output shaft and engaged with the third input gear;

a first synchronizer selectively connecting the third speed gear or the fifth speed gear to the first output shaft;

a second speed gear rotatably disposed on the first output shaft and engaged with the fourth input gear;

a fourth speed gear rotatably disposed on the first output shaft and engaged with the fifth input gear;

a second synchronizer selectively connecting the second speed gear or the fourth speed gear to the first output shaft; and a first output gear fixedly disposed on the first output shaft, wherein the second speed output unit comprises:

the second output shaft disposed in parallel with and apart from the first and second input shafts;

a seventh speed gear rotatably disposed on the second output shaft and engaged with the first input gear;

a third synchronizer selectively connecting the seventh speed gear to the second output shaft;

a sixth speed gear rotatably disposed on the second output shaft and engaged with the fifth input gear;

a reverse speed gear rotatably disposed on the second output shaft;

a fourth synchronizer selectively connecting the sixth speed gear or the reverse speed gear to the second output shaft; and a second output gear fixedly disposed on the second output shaft, wherein the idle module comprises:

the idle shaft disposed in parallel with and apart from the first and second input shafts;

a first idle gear fixedly disposed on a first end portion of the idle shaft and engaged with one input gear on the first input shaft;

a second idle gear including an idle input gear and an idle output gear integrally formed with each other and rotatably disposed on a second end portion of the idle shaft, wherein the idle input gear is engaged with one input gear on the second input shaft and the idle output gear is engaged with the reverse speed gear disposed on one of the first and second output shafts;

a third idle gear rotatably disposed on the idle shaft and engaged with one input gear on the second input shaft; and a fifth synchronizer selectively connecting the third idle gear to the idle shaft, and wherein the first idle gear is engaged with the second input gear on the first input shaft, the idle input gear of the second idle gear is engaged with the sixth input gear on the second input shaft, the idle output gear of the second idle gear is engaged with the reverse speed gear on the second output shaft, and the third idle gear is engaged with the fifth input gear on the second input shaft.

* * * * *